(12) United States Patent
Netz et al.

(10) Patent No.: US 7,313,559 B2
(45) Date of Patent: Dec. 25, 2007

(54) SYSTEM AND METHOD FOR ANALYTICALLY MODELING DATA ORGANIZED ACCORDING TO A REFERENCED ATTRIBUTE

(75) Inventors: Amir Netz, Bellevue, WA (US);
Cristian Petculescu, Redmond, WA (US); Mosha Pasumansky, Redmond, WA (US); Alexander Berger, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 10/199,584

(22) Filed: Jul. 19, 2002

(65) Prior Publication Data

US 2004/0015471 A1    Jan. 22, 2004

(51) Int. Cl.
*G06F 17/30* (2006.01)
(52) U.S. Cl. .............................. 707/100; 707/3; 707/10
(58) Field of Classification Search .................... 707/3, 707/10, 100, 103 Y, 103 R
See application file for complete search history.

(56) References Cited

U.S. PATENT DOCUMENTS

| | | | | |
|---|---|---|---|---|
| 5,832,475 A | * | 11/1998 | Agrawal et al. | 707/2 |
| 5,913,210 A | * | 6/1999 | Call | 707/4 |
| 5,991,754 A | * | 11/1999 | Raitto et al. | 707/2 |
| 6,154,738 A | * | 11/2000 | Call | 707/4 |
| 6,161,103 A | * | 12/2000 | Rauer et al. | 707/4 |
| 6,212,524 B1 | * | 4/2001 | Weissman et al. | 707/101 |
| 6,381,596 B1 | * | 4/2002 | Bayer | 707/4 |
| 6,418,441 B1 | * | 7/2002 | Call | 707/10 |
| 6,480,836 B1 | * | 11/2002 | Colby et al. | 707/3 |
| 6,484,179 B1 | * | 11/2002 | Roccaforte | 707/102 |
| 6,578,030 B1 | * | 6/2003 | Wilmsen et al. | 707/3 |
| 7,167,856 B2 | * | 1/2007 | Lawder | 707/3 |

OTHER PUBLICATIONS

Pu et al. Concise descriptions of subsets of structured sets, ACM Transactions on Database System. vol. 30, Issue. 1, pp. 211-248.*
Dimitri Theodorators Exploiting hierarchical clustering in evaluating multidimensional aggregation queries, Data warehousing and OLAP, pp. 63-70, 2003.*
Yufei et al. Efficient Skyline and Top-K Retrieval in Subspaces, IEEE Transaction on Knowledge and Data Engeneering, pp. 1-35, 2007.*
Jin et al. Communication and memory optimal parallel data cube construction, Parallel and Distributed System, IEEE Transaction, vol. 16, Issue. 12, pp. 1105-1119, Dec. 2005.*
Dash, A.K. et al., "Dimensional Modeling for a Data Warehouse", *Software Engineering Notes*, Nov. 2001, 26(6), 83-84.
Espil, M.M. et al., "Efficient Intensional Redefinition of Aggregation Hierarchies in Multidimensional Dayabases", *DOLAP*, Nov. 9, 2001, 8 pages.

(Continued)

*Primary Examiner*—Cam Y Truong
*Assistant Examiner*—Baoquoc N. To
(74) *Attorney, Agent, or Firm*—Woodcock Washburn LLP

(57) ABSTRACT

A system and method for analytically modeling data in a data cube is disclosed. A first dimension of the data cube is modeled according to a first table having a referencing attribute. A second dimension of the data cube is modeled according to a second table having a referenced attribute. The first dimension is tied to the second dimension according to the referencing attribute and the referenced attribute.

9 Claims, 9 Drawing Sheets

OTHER PUBLICATIONS

Harinarayan, V. et al., "Implementing Data Cubes Efficiently", *SIGMOD*, 1996, 205-216.

Hurtado, C.A. et al., "Updating OLAP Dimensions", *DOLAP*, 1999, 60-66.

Niemi, T. et al., "Constructing OLAP Cubes Based on Queries", *DOLAP*, Nov. 9, 2001, 9-15.

Pourabbas, E. et al., "Characterization of Hierarchies and Some Operators in OLAP Environment", *DOLAP*, 1999, 54-59.

* cited by examiner (Prior Art)

SYSTEM AND METHOD FOR ANALYTICALLY MODELING DATA ORGANIZED ACCORDING TO A REFERENCED ATTRIBUTE

BACKGROUND OF THE INVENTION

1. Field of the Invention

The present invention relates to systems and methods for analytically modeling data organized and stored in a relational database, and, more particularly, to analytically modeling data organized according to a referenced attribute.

2. Description of the Prior Art

Online analytical processing (OLAP) is a key part of many data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In this context, an OLAP cube may be modeled according to a user's perception of the data. The cube may have multiple dimensions, each dimension modeled according to attributes of the data. Typically, there is a hierarchy associated with each dimension. For example, a time dimension can consist of years subdivided into months subdivided into weeks subdivided into days, while a geography dimension can consist of countries subdivided into states subdivided into cities. Dimension members act as indices for identifying a particular cell or range of cells within the cube.

OLAP services are often used to analytically model data that is stored in a relational database such as, for example, an Online Transactional Processing (OLTP) database. Data stored in a relational database may be organized according to multiple tables with each table having data corresponding to a particular data type. A table corresponding to a particular data type may be organized according to columns corresponding to data attributes. For example, data corresponding to the type "Customer" may be organized in a "Customer" table with columns "Customer ID" and "Location ID". Data corresponding to the type "Location" may be organized in a "Location" table with columns "Location ID", "City", and "State".

The "Customer" table may be referred to as a "referencing" table, and the "Location" table may be referred to as a "referenced" table because data in the "Location" table is referenced by corresponding data in the "Customer" table. To obtain location data for a particular customer, the "Location ID" for the customer may be obtained based on the customer's "Customer ID" in the "Customer" table. Next, an entry having the obtained "Location ID" is found in the "Location" table based on the "Location ID" attribute thereof. Finally, from such found entry, the "State" and "City" are obtained for the "Customer ID" and customer.

One issue that arises with regard to analytically modeling data from a relational database is how to best model data with such a referenced table. In existing methods for analytically modeling data with a referenced table, a single dimension is modeled according to both a particular referencing table and a referenced table. The single dimension has a dimension hierarchy that includes attributes in the referencing table, which may be referred to as "referencing attributes" and attributes in the referenced table, which may be referred to as "referenced attributes". For example, in such an existing method, an OLAP cube has a "Customer" dimension modeled according to both the "Customer" table and the "Location" table. The "Customer" dimension has a dimension hierarchy including "State" subdivided by "City" subdivided by "Customer ID".

Including the referenced attributes in the dimension hierarchy of the single dimension is repetitive because multiple data entries corresponding to referenced attributes may have identical values. For example, with regard to the "Customer" and "Location" tables, multiple customers may reside in the same state and/or city. This repetition is exacerbated when multiple referencing tables refer to a single referenced table. This repetition would be eliminated if, rather than including referenced attributes in the dimension hierarchy of each dimension, referenced attributes were included only in the dimension hierarchy of a "referenced dimension" modeled according to the referenced table and referred to by the referencing dimension. Such elimination of repetition results in a reduction of data storage size and a reduction of the time required for modeling the cube.

SUMMARY OF THE INVENTION

Accordingly, in the present invention, a system and method for analytically modeling data with a referenced attribute is disclosed. In a relational database, a first table organizes a first type according to a first attribute. A second table organizes a second type according to the first attribute and a second attribute. A third table organizes a third type according a third attribute. The second attribute of the second table is related to the third attribute of the third table such that the second table may be cross-referenced to the third table thereby.

The data stored in the relational database is analytically modeled. A measure is modeled according to the first type of the first table. A first dimension is modeled according to the second type of the second table. A second dimension is modeled according to the third type of the third table. The measure is tied to the first dimension according to the first attribute of the first and second tables to allow the measure to be analyzed by the first dimension according to the first attribute. The first dimension is tied to the second dimension according to the second attribute of the second table and the third attribute of the third table to allow the measure to be analyzed by the second dimension according to the second and third attribute. Thus, the first dimension references the second dimension.

BRIEF DESCRIPTION OF THE DRAWINGS

The illustrative embodiments will be better understood after reading the following detailed description with reference to the appended drawings, in which.

DETAILED DESCRIPTION

Figure 1:
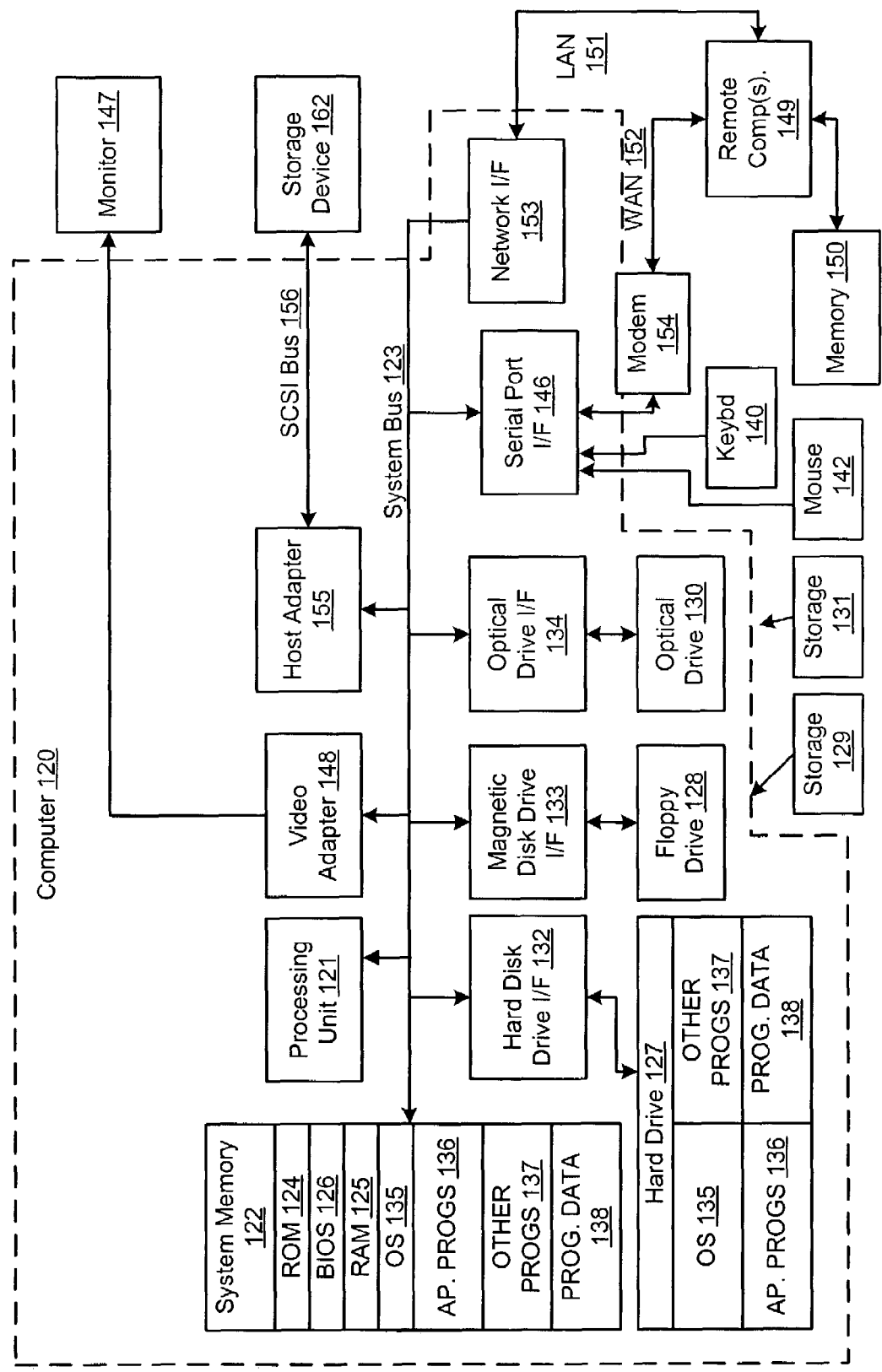
FIG. 1 is a block diagram representing a general purpose computer system in which aspects of the present invention and/or portions thereof may be incorporated.

A system and method for analytically modeling data with related attributes is disclosed below with reference to the aforementioned drawings. Those skilled in the art will readily appreciate that the description given herein with respect to those drawings is for explanatory purposes only and is not intended in any way to limit the scope of the invention to the specific embodiments shown. Throughout the description, like reference numerals are employed to refer to like elements in the respective figures.

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

Figure 2:
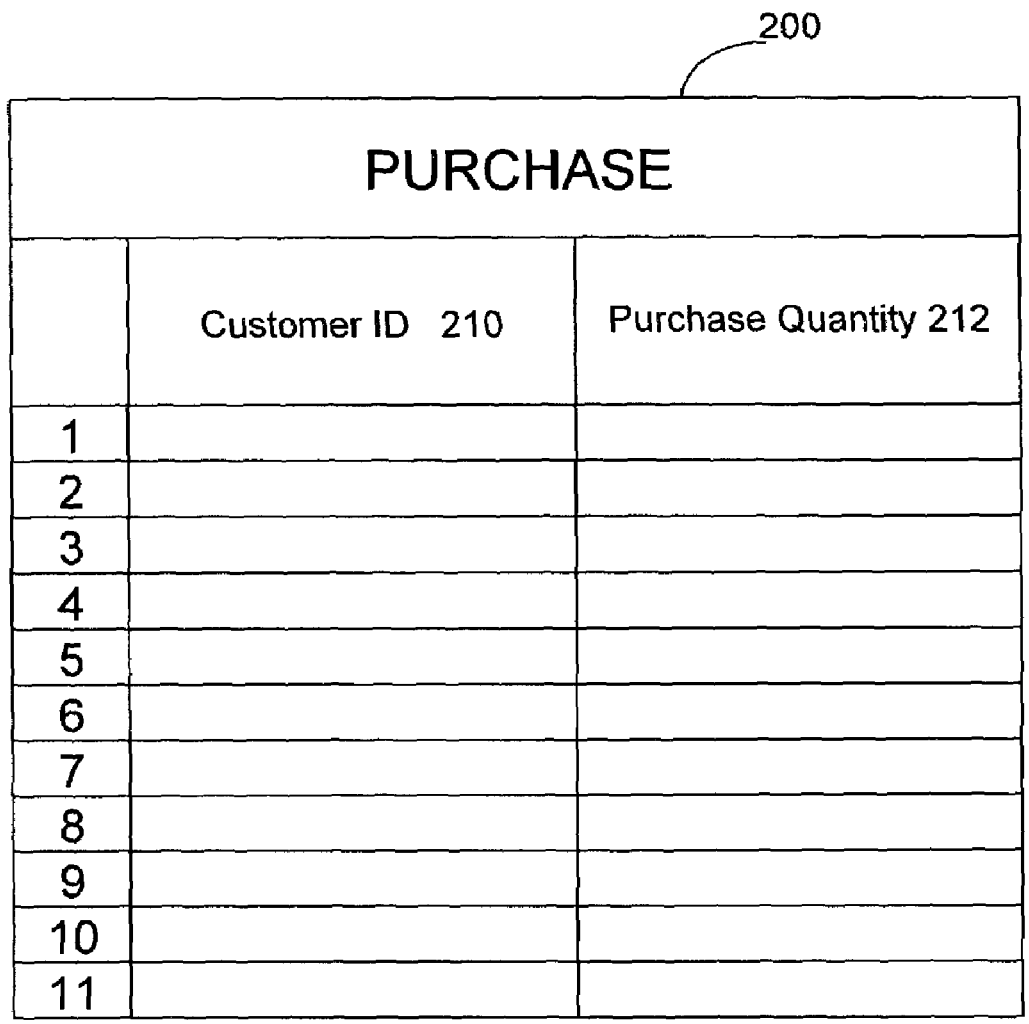
FIG. 2 is a sample relational database table corresponding to "Purchase" data.
Figure 3:
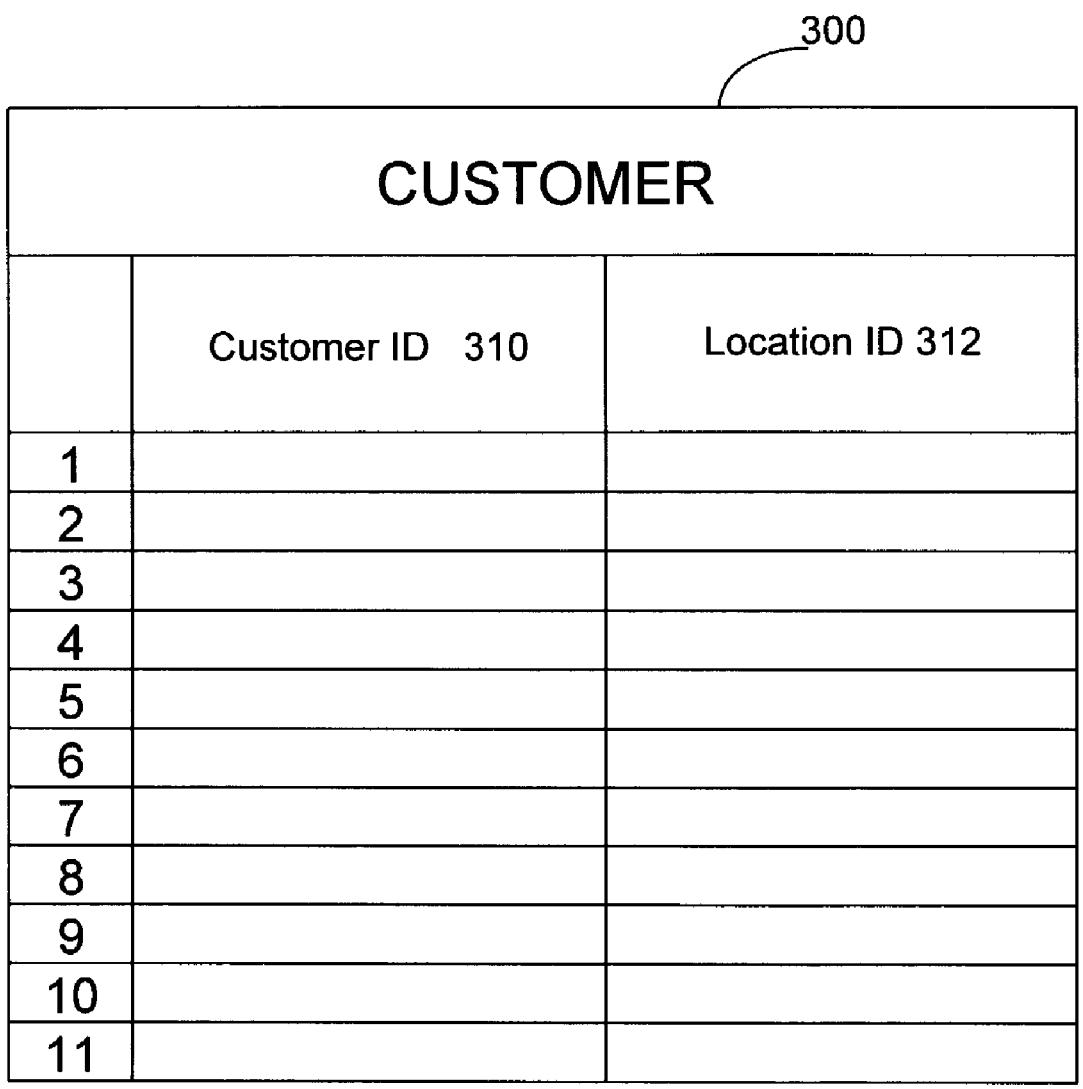
FIG. 3 is a sample relational database table corresponding to "Customer" data.
Figure 4:
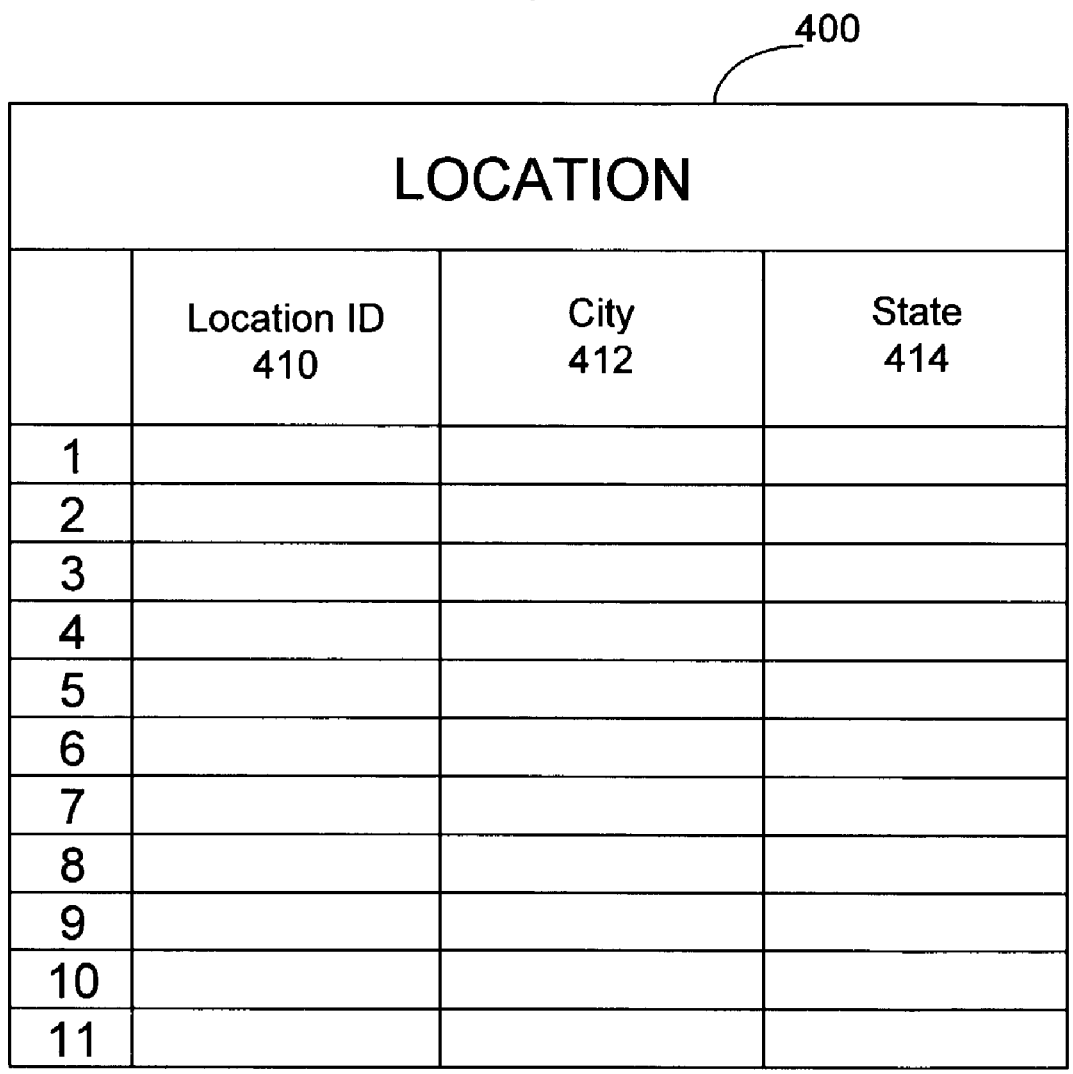
FIG. 4 is a sample relational database table corresponding to "Location" data.

An analytical data service such as, for example, On-Line Analytical Processing (OLAP) may be employed to model data stored in a relational database such as, for example, an On-Line Transactional Database (OLTP). As set forth previously, data stored in a relational database may be organized according to multiple tables, with each table having data corresponding to a particular data type. A table corresponding to a particular data type may be organized according to columns corresponding to data attributes. One such table is shown in FIG. 2, with data corresponding to the type "Purchase" organized in a "Purchase" table 200 with columns including "Customer ID" 210 and "Purchase Quantity" 212 among others. Another such table is shown in FIG. 3, with data corresponding to the type "Customer" organized in a "Customer" table 300 with columns "Customer ID" 310 and "Location ID" 312. Another such table is shown in FIG. 4, with data corresponding to the type "Location" organized in a "Location" table 400 with columns "Location ID" 410, "City" 412, and "State" 414.

"Customer" table 300 may be referred to as a "referencing" table, and "Location" table 400 may be referred to as a "referenced" table because data in "Location" table 400 is referenced by corresponding data in "Customer" table 300. To obtain location data for a particular customer, the "Location ID" 312 for the customer may be obtained based on the customer's "Customer ID" 310 in "Customer" table 300. Next, an entry having the obtained "Location ID" 312 is found in "Location" table 400 based on the "Location ID" attribute 410 thereof. Finally, from such found entry, "State" 414 and "City" 412 are obtained for the "Customer ID" 310 and customer. As should be appreciated, other referencing tables (not shown) that reference "Location" table 400 may also be present.

"Purchase" table 200 organizes each purchase according to a "Customer ID" 210 such as "Customer ID" 310 in "Customer" table 300. Accordingly, "Purchase" table 200 may also have additional columns (not shown) corresponding to additional attributes relevant to each purchase.

Figure 5:
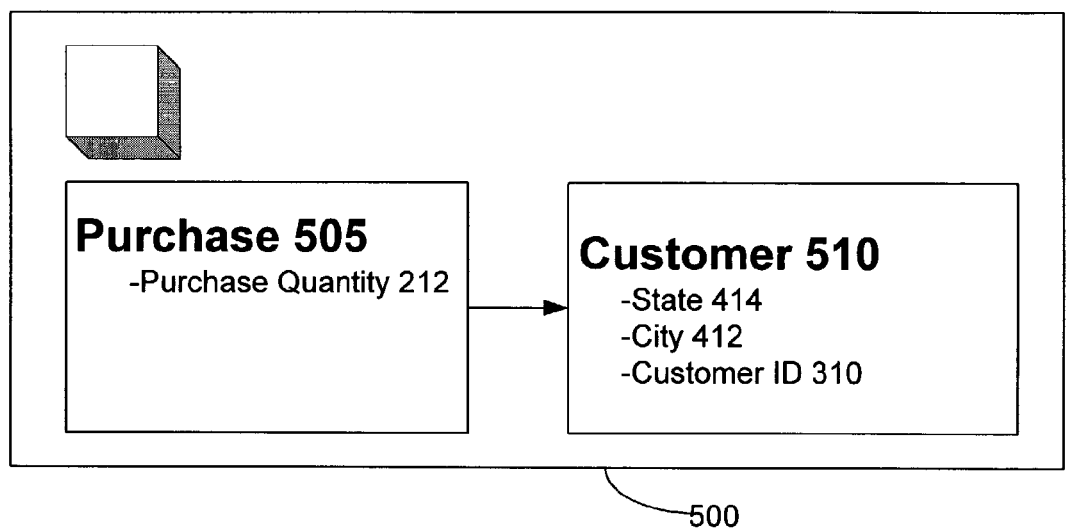
FIG. 5 is a prior art analytical data cube derived from the tables of FIGS. 2-4.

Referring now to FIG. 5, a prior art model of the data from "Purchase" table 200, "Customer" table 300, and "Sales" table 400 is shown as organized into a data cube 500. Cube 500 has a measure "Purchase" 505 modeled according to "Purchase" table 200. Cube 500 also has a dimension 510 modeled according to referencing "Customer" table 300 and referenced "Location" table 400. The measure "Purchase" 505 is tied to the dimension "Customer" 510 according to the attribute "Customer ID" 210, 310 of tables 200, 300. This relationship is shown in FIG. 5 by the line connecting "Purchase" measure 505 and "Customer" dimension 510. As should be appreciated, other dimensions (not shown) may also be present.

Figure 6:
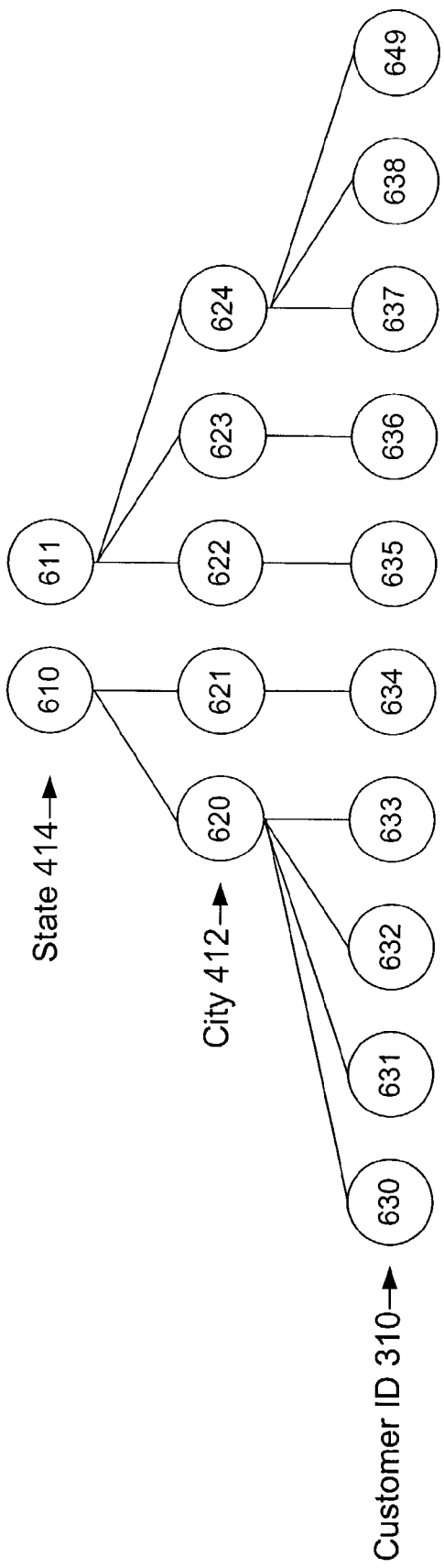
FIG. 6 is a hierarchical data tree showing data organized in a dimension of the cube of FIG. 5 according to a plurality of gradations.

As shown, "Customer" dimension 510 has a dimension hierarchy that includes both "referencing" attributes from referencing "Customer" table 300 and "referenced" attributes from referenced "Location" table 400. As should be appreciated, Location ID attribute 312 of FIG. 3 and 410 of FIG. 4 is both a referencing attribute and a referenced attribute, and, therefore, acts as a cross-referencing attribute that need not necessarily be included in the hierarchy. The dimension hierarchy of referencing "Customer" dimension 510 is represented by data tree 600 as shown in FIG. 6. Nodes 610 and 611 in the top row are "State" nodes corresponding to "State" attribute 414 in FIG. 4. Nodes 620-624 in the second row are "City" nodes corresponding to "City" attribute 412 in FIG. 4. Nodes 630-639 in the third row are "Customer ID" nodes corresponding to "Customer ID" attribute 310 in FIG. 3. As should be appreciated, one advantage of a hierarchically organized analytical data model is that such a model allows data to be aggregated based on a query. In particular, data aggregated according to the dimension hierarchy of FIG. 7 may be aggregated based on any of the levels in the hierarchy. For example, if a query requires a purchase quantity for a specific city, then data may be aggregated by "City" attribute 412 and the second row of data tree 600.

Including the referenced attributes in the dimension hierarchy of dimension 510 of cube 500 is repetitive because multiple data entries corresponding to a referenced attribute may have identical values. For example, with regard to "Customer" table 300 and "Location" table 400, multiple customers may reside in the same state and/or city. This repetition is exacerbated when multiple referencing tables refer to a single referenced table 400. This repetition would be eliminated if, rather than including referenced attributes in the dimension hierarchy of each dimension, referenced attributes were included only in the dimension hierarchy of a single "referenced dimension" modeled according to referenced table 400 and referred to by each referencing dimension.

Figure 7:
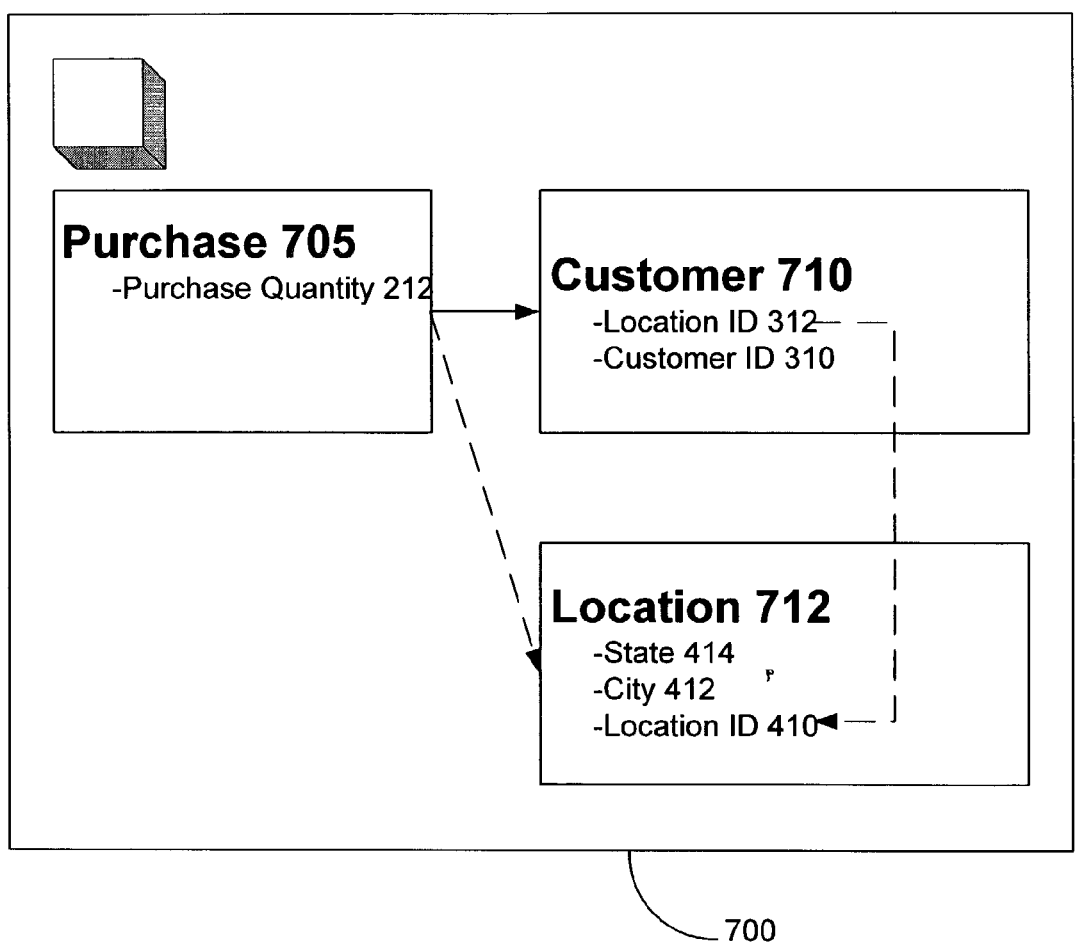
FIG. 7 is an analytical data cube derived from the tables of FIGS. 2-4 in accordance with one embodiment of the present invention.

Referring now to FIG. 7, analytical data cube 700 is an analytical model of the data from "Customer" table 300 and "Location" table 400 in accordance with one embodiment of the present invention. Cube 700 has a measure "Purchase" 705 modeled according to "Purchase" table 200. Cube 700 also has both a referencing "Customer" dimension 710 modeled according to "Customer" table 300 of FIG. 3 and a referenced "Location" dimension 712 modeled according to "Location" table 400 of FIG. 4. As should be appreciated, other dimensions (not shown) may be modeled according to other tables (not shown). Unlike prior art data cube 500 of FIG. 5 that has a single dimension 510 that encompasses the data from referencing "Customer" table 300 of FIG. 3 and from referenced "Location" table 400 of FIG. 4, data cube 700 has the aforementioned referencing dimension 710 and referenced dimension 712. Accordingly, data from the referenced "Location" table 400 is not replicated multiple times in the referencing "Customer" dimension 710. Such elimination of repetition results in a reduction of data storage size and a reduction of the time required for modeling the cube. These advantages are increased when the referenced dimension 712 is referenced by more than one referencing dimension.

Figure 8:
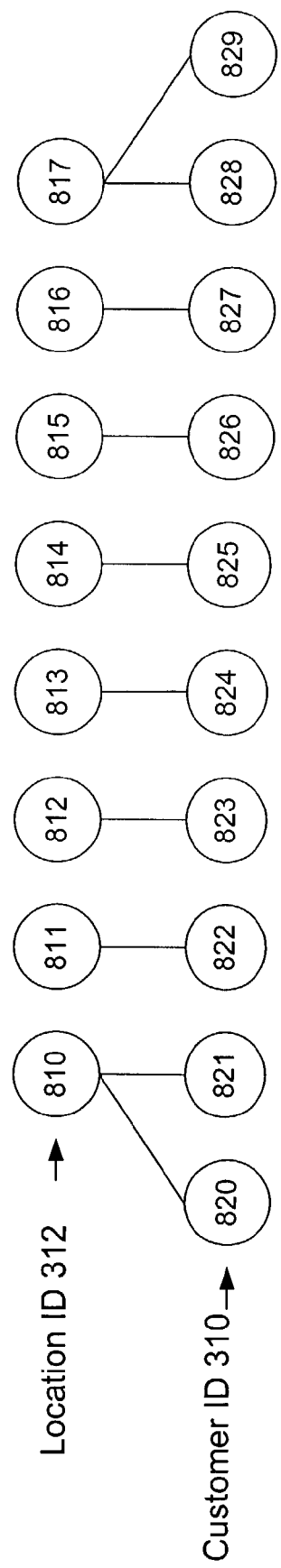
FIG. 8 is a hierarchical data tree showing data organized in a dimension of the cube of FIG. 7 according to a plurality of gradations.

Referencing "Customer" dimension 710 has a dimension hierarchy including each attribute 310, 312 from referencing "Customer" table 300 of FIG. 3. The dimension hierarchy of referencing "Customer" dimension 710 is represented by data tree 800 as shown in FIG. 8. As shown, nodes 810-817 in the top row are "Location ID" nodes corresponding to "Location ID" attribute 312 in FIG. 3. Nodes 820-829 in the second row are "Customer ID" nodes corresponding to "Customer ID" attribute 310 in FIG. 3.

Figure 9:
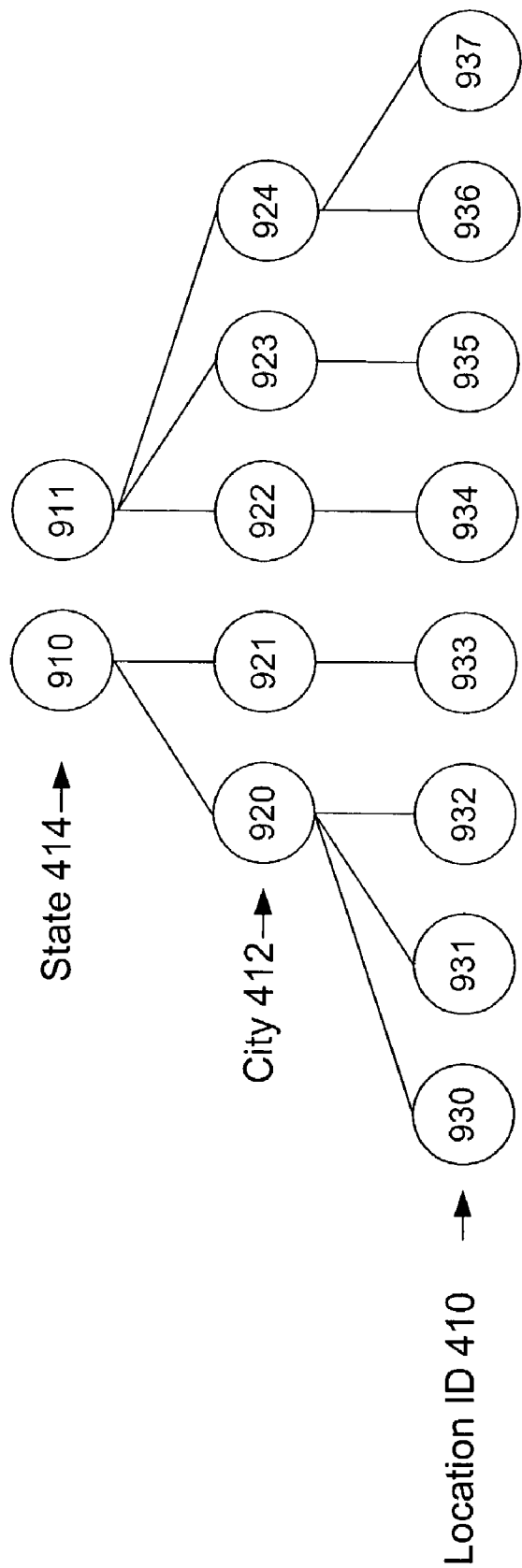
FIG. 9 is a hierarchical data tree showing data organized in a dimension of the cube of FIG. 7 according to a plurality of gradations.

Referenced "Location" dimension 712 has a dimension hierarchy including each attribute 410-414 from referenced "Location" table 400 of FIG. 4. The dimension hierarchy of referenced "Location" dimension 712 is represented by data tree 900 as shown in FIG. 9. Nodes 910-912 in the first row are "State" nodes corresponding to "State" attribute 414 in FIG. 4. Nodes 920-924 in the second row are "City" nodes corresponding to "City" attribute 412 in FIG. 4. Nodes 930-937 in the third row are "Location ID" nodes corresponding to "Location ID" attribute 410 in FIG. 4. As should be appreciated, cube 700 may be used to analyze queries aggregated by any row of nodes in "referencing" data tree 800 or "referenced" data tree 900. For example, total purchase quantity by state or city may be analyzed, where the relationship between purchase quantity and state or city is through customer.

Thus, a system and method for analytically modeling data with a referenced attribute is disclosed. The system and method of the present invention eliminate the repetition associated with existing methods in which referenced attributes are included in the dimension hierarchy of each dimension of the cube. Such existing methods are repetitive because multiple data entries corresponding to a referenced attribute may have identical values. For example, with regard to the "Customer" and "Location" tables, multiple customers may reside in the same state and/or city. This repetition is exacerbated when multiple referencing tables refer to a single referenced table. The system and method of the present invention eliminate the repetition by employing a referencing dimension that references a referenced dimension.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

While the invention has been described and illustrated with reference to specific embodiments, those skilled in the art will recognize that modifications and variations may be made without departing from the principles of the invention as described above and set forth in the following claims. For example, while the invention has been described with reference to a "Purchase", "Customer", and "Location" tables, the invention may be used in conjunction with any table from a relational database. Furthermore, the analytical data models of the present invention may comprise any number of dimensions corresponding to any number of data attributes. Accordingly, reference should be made to the appended claims as indicating the scope of the invention.

We claim:

1. A computer readable medium having stored thereon computer-executable instructions, that, when executed by a computer, cause the computer to perform steps comprising:
   generating a data cube that comprises at least three dimensions, one of the dimensions being a first dimension that represents a first hierarchy comprising a first plurality of levels, the first plurality of levels comprising a root level, at least one intermediate level, and a leaf level;
   responsive to a command, splitting the first dimension into two dimensions by: dividing the first hierarchy into a first sub-hierarchy and a second sub-hierarchy, whereby the root level of the first hierarchy becomes a root level of the first sub-hierarchy, a single one of the intermediate levels of the first hierarchy becomes both a leaf level of the first sub-hierarchy and a root level of the second sub-hierarchy, and the leaf level of the first hierarchy becomes a leaf level of the second sub-hierarchy;
   adjusting the first dimension such that the first dimension represents only the first sub-hierarchy rather than the complete first hierarchy; and
   adding an additional dimension to the data cube to represent the second sub-hierarchy; and
   populating the data cube with data according to each dimension of the data cube including the additional dimension;
   receiving a query that requests a portion of the data populated within the data cube including the additional dimension;
   processing the query; and
   displaying query results to a user.

2. The computer readable medium of claim 1 having further computer-executable instructions for performing the step of:
   retrieving data from a relational database with which to generate the data cube.

3. The computer readable medium of claim 1, wherein the data cube is formatted for online analytical processing.

4. A method for query processing comprising:
   generating a data cube that comprises at least three dimensions, one of the dimensions being a first dimension that represents a first hierarchy comprising a first plurality of levels, the first plurality of levels comprising a root level, at least one intermediate level, and a leaf level;
   responsive to a command, splitting the first dimension into two dimensions by: dividing the first hierarchy into a first sub-hierarchy and a second sub-hierarchy, whereby the root level of the first hierarchy becomes a root level of the first sub-hierarchy, a single one of the intermediate levels of the first hierarchy becomes both a leaf level of the first sub-hierarchy and a root level of the second sub-hierarchy, and the leaf level of the first hierarchy becomes a leaf level of the second sub-hierarchy;
   adjusting the first dimension such that the first dimension represents only the first sub-hierarchy rather than the complete first hierarchy; and
   adding an additional dimension to the data cube to represent the second sub-hierarchy; and
   populating the data cube with data according to each dimension of the data cube including the additional dimension;
   receiving a query that requests a portion of the data populated within the data cube including the additional dimension;
   processing the query; and
   displaying query results to a user.

5. The method of claim 4, further comprising:
   retrieving data from a relational database with which to generate the data cube.

6. The method of claim 4, comprising generating the data cube formatted for online analytical processing.

7. A system for query processing, the system comprising:
   a processor operative to execute computer-executable instructions; and
   memory having stored therein computer-executable instructions for performing steps comprising:
      generating a data cube that comprises at least three dimensions, one of the dimensions being a first dimension that represents a first hierarchy comprising a first plurality of levels, the first plurality of levels comprising a root level, at least one intermediate level, and a leaf level;
      responsive to a command, splitting the first dimension into two dimensions by:
         dividing the first hierarchy into a first sub-hierarchy and a second sub-hierarchy, whereby the root level of the first hierarchy becomes a root level of the first sub-hierarchy, a single one of the intermediate levels of the first hierarchy becomes both a leaf level of the first sub-hierarchy and a root level of the second sub-hierarchy, and the leaf level of the first hierarchy becomes a leaf level of the second sub-hierarchy;

adjusting the first dimension such that the first dimension represents only the first sub-hierarchy rather than the complete first hierarchy; and adding an additional dimension to the data cube to represent the second sub-hierarchy; and populating the data cube with data according to each dimension of the data cube including the additional dimension;

receiving a query that requests a portion of the data populated within the data cube including the additional dimension; and processing the query; and displaying query results to a user.

8. The system of claim 7, wherein the data cube is generated by retrieving data from a relational database.

9. The system of claim 7, wherein the data cube is formatted for online analytical processing.

* * * * *